United States Patent [19]

Barmat

[11] Patent Number: 4,689,625
[45] Date of Patent: Aug. 25, 1987

[54] SATELLITE COMMUNICATIONS SYSTEM AND METHOD THEREFOR

[75] Inventor: Melvin Barmat, Bethesda, Md.

[73] Assignee: Martin Marietta Corporation, Bethesda, Md.

[21] Appl. No.: 668,849

[22] Filed: Nov. 6, 1984

[51] Int. Cl.$^4$ ............................................... H04B 7/19
[52] U.S. Cl. ...................................... 342/356; 342/353
[58] Field of Search ............... 343/353, 356, 361–365; 342/353, 356, 361–365

[56] References Cited

U.S. PATENT DOCUMENTS 4,188,578  2/1980  Reudink et al. ...................... 343/353
4,292,685  9/1981  Lee ....................................... 343/365

Primary Examiner—Thomas H. Tarcza
Assistant Examiner—Donald E. Hayes, Jr.
Attorney, Agent, or Firm—Cushman, Darby & Cushman

[57] ABSTRACT

A satellite communications system and method of communication which results in increased frequency-reusage within assigned frequency bands and allows for a reduction in satellite transponder requirements per unit of bandwidth employed. The disclosed system employs a satellite in a geostationary orbit having transponders and one or more large-aperture, high-gain antennas that provide a broad-area beam for a relatively wide service area and for transmitting to and receiving signals from N narrow-area beams for N respective sub-areas, the sub-areas corresponding to the high-traffic nodes. Both beam types operate in the same allocated frequency bands but with opposite linear or opposite handed circular polarizations, or, alternatively, with arbitrarily determined portions of the allocated frequency band pairs with dual polarization so that the allocated frequency spectrum is used at least N+1 times. Since the narrow-area beams provide a substantially smaller illumination pattern than the broad-area beam, substantially less power is required to form each narrow-area beam at the satellite antenna so that each additional narrow-area beam results in a frequency reuse with only a relatively small incremental increase in drive power requirements. Because of the reduced incremental satellite power requirements associated with the multiple additional frequency reusages, the high power amplifiers (HPA's) of the satellite transponders for the narrow-area beams can be backed-off from non-linear operation into their linear regions to allow multiple signal carrier amplification in each HPA to thus reduce the total HPA requirements for the system.

11 Claims, 5 Drawing Figures

SATELLITE COMMUNICATIONS SYSTEM AND METHOD THEREFOR

BACKGROUND OF THE INVENTION

The present invention relates to satellite communication systems and communication methods therefor and, more particularly, to such systems and methods by which substantial improvements in overall communications efficiency are obtained.

In active communications satellite systems, a transponder-equipped satellite is positioned in a geostationary orbit to provide broadcast, navigation, communications, or similar services to a service area or areas. A service area is defined as the geographic region in which an earth station can receive signals from or send signals to the satellite economically. Various transponder architectures are available for communication satellites, one common architecture includes a broad-area beam antenna that covers the service area or areas for receiving up-link transmissions across an entire allocated up-link frequency band (e.g., 14.0 to 14.5 GHz) and a receiver that amplifies and down-converts the up-link transmission frequencies to frequencies within an allocated down-link frequency band (e.g., 11.7 to 12.2 GHz). Band-pass filters coupled to the receiver output divide the down-converted frequency spectrum into separate channels of selected bandwidth (e.g., 40 MHz). Each channel is amplified along separate gain paths by one or more stages of amplification that include a high power amplifier (HPA), typically, a traveling wave tube amplifier (TWTA) as the final stage. After post-amplification signal processing that can include additional filtering and combining, the HPA amplified signal energy is presented to the broad-area beam antenna for down link transmission to the service area or areas. In order to optimize the efficiency of the post-receiver amplifier function, the high power amplifiers are oftentimes operated in a non-linear mode, that is, the operating region where additional input signal power does not cause a proportional increase in output signal power. When operating in this mode, the HPA will generally amplify one signal carrier most efficiently; multiple signal carrier amplification causing intermodulation interference and other problems.

Various up-link and down-link arrangements have been used to effect communications with the satellite. In particular, discrete frequency bands have been allocated on an international basis for up-link and down-link transmission. Because of orbit/spectrum scarcity, as well as economic reasons, it is desirable to increase spectral efficiency by reusing the frequencies in the same satellite or orbit location. For example, the same up-link and/or down-link frequency can be used simultaneously in two separate narrow-area beams directed from the satellite to widely separated geographical locations on the earth, the angular separation between the two beams preventing mutual interference between the two in both the up-link and down-link signals. It is also known in communications satellite systems to employ a broad-area beam antenna for uniformly illuminating the entire service area, such as the continental United States, with signal transmissions that operate in the entire allocated frequency band but with emissions that are either linearly or circularly polarized in a first direction and emissions that are oppositely polarized. Thus in the Ku-band, information-bearing carriers in the 11.7 to 12.2 GHz down-link frequency band can be vertically polarized and additional information-bearing carriers in the same frequency band can be horizontally polarized. Provided the oppositely polarized signals have approximately the same power flux density at the receiving antenna and the receiving earth station is properly equipped, the information content of the oppositely polarized, same frequency signals can be independently demodulated. Up-link communications can likewise be established in a manner analogous to the down-link communications. Polarization discrimination thus allows the allocated frequency band to be used twice in the same geographical area to effectively double information transfer capacity.

While the satellite architecture and communication link arrangements described above have been reasonably well suited for prior communication requirements, the total number of satellite positions available in the geostationary orbit and the allocated frequencies for up-link and down-link communications are limited. As the amount of world-wide signal traffic increases, a need arises for increasing the ultimate communications capacity of the satellite while reducing the on-board equipment and power requirements to provide a decrease in information transmission costs.

SUMMARY OF THE INVENTION

In view of the above, it is a principal object of the present invention to provide a satellite communications system and method that provide improved communications efficiency.

It is an additional object of the present invention to provide a satellite communications system in which increased communications efficiency is achieved by increasing the frequency reuse rate over known systems.

It is a further object of the present invention to provide a satellite communications system in which an increase in communications efficiency is obtained by increasing frequency reusage with only an incremental increase in power, weight, and complexity requirements for the satellite transponders.

It is still another object of the present invention to provide a satellite communications system having increased communications efficiency by which the cost of information transfer is reduced.

In accordance with these objects, and others, the present invention provides for a communications satellite in a geostationary orbit having transponders and one or more high-gain, large-aperture antennas for providing broad-area beam emission and reception in conjunction with an intended principal service area and at least N narrow-area beams for illuminating and receiving signals from N respective sub-areas, preferably corresponding to the N highest traffic nodes within the principal service area, where N is an integer greater than 1. If desired, selected of the N narrow-area beams can illuminate and receive signals from respective sub-areas outside the principal service area. Both beam types operate in the same allocated frequency bands. In one configuration of the invention, the up-link and down-link signals of the broad-area beam are polarized, either linearly or circularly, in a first polarization alignment and the signals of each of the N narrow-area beams are polarized in the corresponding opposite alignment. Thus the signals in the two types of beams will not cause mutual harmful interference to suitably designed receiving equipment. The allocated up-link and down-link frequency bands are thus used N+1 times from the same orbital position, once for the broad-area beam and once with each narrow-area beam. The narrow-area beams subtend a smaller area on the earth's surface than the broad-area beam so that the radiated energy from or to the satellite required for each narrow-area beam formed by the high-gain antenna or antennas is substantially less than that required for the broad-area beam for equivalent communications capability. Because transmitted signals in each additional narrow-area beam and the frequency reuse it represents requires only an incremental increase in spacecraft power, the high power amplifiers (HPA's) of the satellite transponders associated with the narrow beams can be advantageously backed-off from their non-linear operating regions toward and into their linear operating regions where intermodulation distortion and other deleterious effects are reduced to allow the HPA's to amplify multiple signal carriers without harmful self-interference. Thus, the down-link signal carriers for the various narrow-area beams can be amplified in fewer HPA's compared to prior designs. Likewise, up-link signals may require less radiant energy than similar broad-area beam transmissions.

Additionally, efficient use of the allocated frequency band in both the narrow-area and the broad-area beams can be achieved while preventing mutual harmful interference by dividing the allocated up-link and down-link frequency bands into two paired segments, e.g. segment A and segment B. The broad-area beam can employ the frequency pair A twice through the above described mechanism of dual polarization, and each of the narrow-area beams can employ the frequency pair B twice through the same dual polarization technique. If segment A and segment B are approximately equal in bandwidth, N+1 uses of the allocated bands are thus provided.

The present invention advantageously increases communications efficiency by multiplying the frequency reusage with only incremental increases in power and weight requirements for each reuse to allow a reduction in satellite transponder complexity and other requirements in such a way that communication costs are substantially reduced over prior systems.

BRIEF DESCRIPTION OF THE DRAWING

A further understanding of the present invention and its scope of application will become apparent from the detailed description to follow, taken in conjunction with the accompanying drawings, in which like parts are designated by like reference characters.

DESCRIPTION OF THE PREFERRED EMBODIMENT

Figure 1:
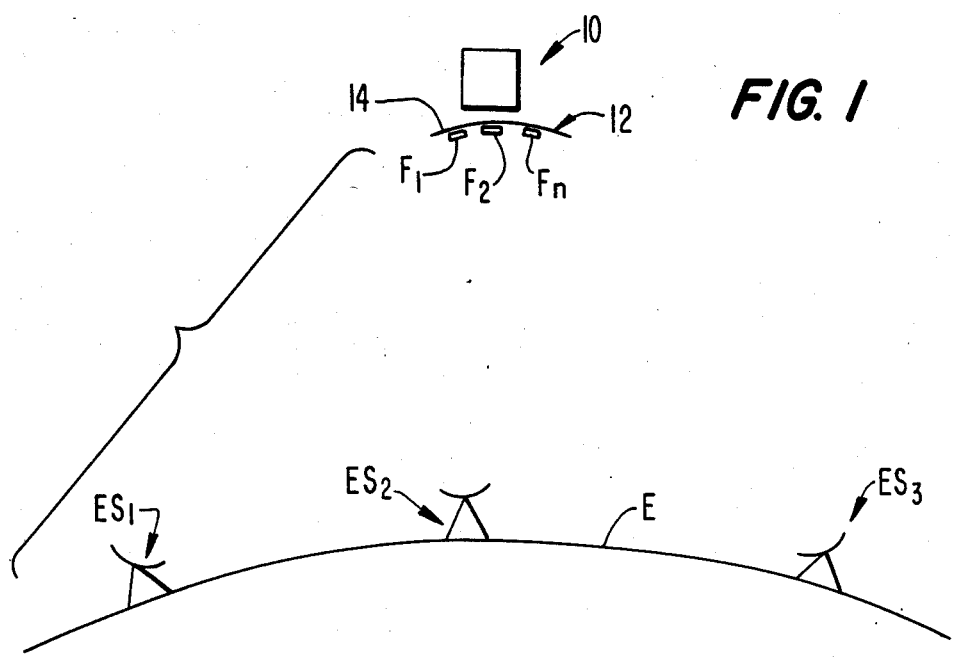
FIG. 1 is an idealized schematic view of a satellite in a geostationary orbit, whose service area is a portion of the earth's surface.
Figure 2:
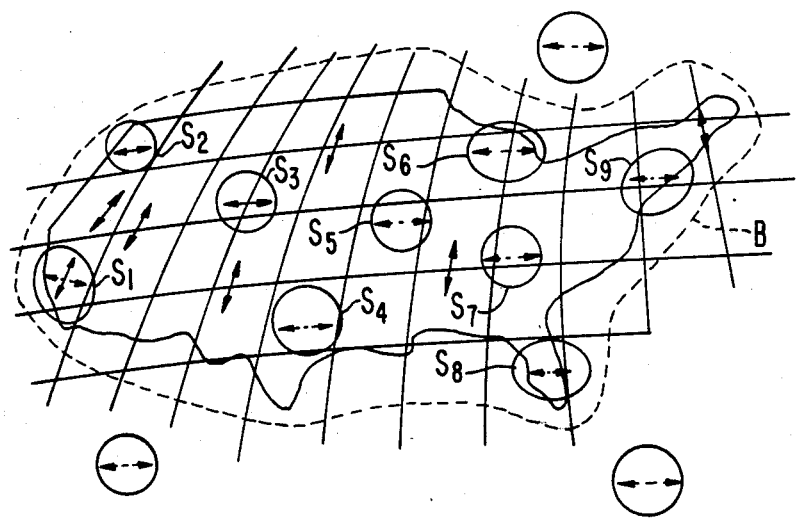
FIG. 2 is an idealized satellite-perspective view of an exemplary domestic service communication area.

The overall organization of a communications satellite system in accordance with the present invention is illustrated in idealized form in FIGS. 1 and 2. As shown in FIG. 1, a satellite 10 is positioned in a geostationary orbit for communication with earth stations $ES_1, ES_2, \ldots ES_n$. The satellite 10 includes transponders, discussed more fully below, and one or more large aperture, high-gain antennas 12 that typically include a curvilinear reflector 14 that conforms to a paraboloidal function although such antennas can include sections conforming to other functions including spheroids and hyperboloids. The antenna 12, which has been illustrated in FIG. 1 as a single unit, includes a plurality of primary electromagnetic feeds $F_1, F_2, \ldots F_n$ that direct radiation onto the reflector 14 surface for reflection to the earth's surface E. The feeds $F_n$, which may take the form of open-ended microwave horns, phased arrays, or the functional equivalent, are advantageously positioned relative to the focus or focii of the reflector 14 to form directed down-link beams from the satellite 10 to the earth's surface E, the beams having a varying beamwidth, contour, direction, and surface illumination patterns, the latter feature also dependent upon the longitudinal position of the satellite 10 within the geostationary orbit. In addition to directing radiation to the earth E, the antenna 12 is effective for receiving up-link emissions. While not specifically illustrated in FIG. 1, the various feeds $F_n$ and/or the reflector or reflectors can be configured to control the alignment of the E-vector of the propagated energy to effect linear polarization, that is, polarization in a first arbitrary alignment, termed herein as vertical polarization or polarization in a second arbitrary alignment orthogonal the first alignment, the second alignment termed herein as horizontal polarization. If desired, circular polarization modes can be utilized with the feeds $F_n$ providing opposite handed alignments.

The earth stations $ES_n$ include one or more tracking, telemetry, and control stations and multiple communication stations. The tracking, telemetry, and control stations are effective to monitor satellite operation, including attitude (yaw, pitch, and roll) and orbit variation, and provide various control signals for vehicle and antenna attitude control and orbital station keeping. The earth stations $ES_n$ are equipped with a typically parabolic antenna and transmitters and receivers with the receiver signal processing path including amplifiers, filters, down-converters, and demodulators and the transmitter signal path including modulators, up-converters, filters, and amplifiers.

FIG. 2 represents an idealized graphical illustration of a preferred system service area, such as the contiguous United States, viewed from the geostationary orbit at approximately 75° W Longitude. As indicated above, the antenna 12 provides a plurality of beams including a broad-area beam and N narrow-area or spot beams $S_1, S_2, S_3, \ldots S_n$ for a total of N+1 beams. Each of these beams defines a communications area on the earth's surface E to which signal carriers can be transmitted from the satellite and from which signal carriers can be received. As illustrated by the dashed contour line "B", the broad-area beam is directed to the principal service area, the contour line "B" representing the −3 dB antenna gain isoline. Where the principal service area is the contiguous United States, as preferred, the broad-area beam can be an approximately 4° by 6° beam directed from the satellite 10. In addition, N narrow-area beams $S_1, S_2, \ldots S_n$ are directed to selected sub-areas within the service area, the sub-areas within the service area being within the −3 dB antenna gain isoline of both the broad-area beam and the respective narrow-area beams. If desired, additional narrow-area beams can be directed to selected sub-areas outside the service area. In FIG. 2, the contours of the narrow-area beams within and outside the principal service area are illustrated by the −3 dB isoline, with a narrow-area beamwidth of 1% to 25% of the broad-area beam being suitable. By way of example in the Ku frequency band, a narrow-area beam width of 0.3° to 0.8° is preferred.

In accordance with one feature of the present invention, the down-links and up-links of the broad-area beam are polarized in a first direction and the down-links and uplinks of the narrow-area beams are polarized in the other direction, with both beam types operating, if desired, across the entire allocated down-link frequency spectrum. For example, the transmissions in the broad-area beam can be polarized in one sense or alignment, e.g., vertically as indicated by the solid vertically aligned double-arrows in FIG. 2, and the transmissions in the various narrow-area beams $S_n$ can be polarized in the alternative sense or alignment, that is, horizontally as indicated by the horizontal dashed double-arrows within each of the narrow-area beam illumination areas $S_1, S_2, S_3, \ldots S_n$. In both cases, the broad-area beam and each of the narrow-area beams operate across the entire frequency spectrum, 11.7 to 12.2 GHz for the down-link and 14.0 to 14.5 GHz for the up-link in the case of the preferred embodiment. In selecting the sub-areas to be defined by the narrow-area beams, it is highly desirable that the narrow-area beams be separated geographically so that interbeam interference levels will be acceptable between the similarly polarized, same frequency carriers. The earth stations $ES_n$ within the narrow-area beam and broad-area beam service areas are illuminated by and can transmit to broad-area antenna feeds as well as the feeds of the respective narrow-area beam.

Efficient frequency reuse can also be achieved by an alternate frequency/polarization arrangement, by arbitrarily dividing the allocated up-link and down-link frequency bands into first and second paired segments. The broad-area beam can employ the first frequency pair twice through by dual polarization, and each of the narrow-area beams can employ the second frequency pair twice through the same dual polarization technique. If the first and second segments are approximately equal in bandwidth, N+1 uses of the allocated up-link and down-link frequency bands are provided.

It is thus possible for an earth station $ES_n$ in the system to communicate with any other earth station in the system. For example, earth stations in the principal service area outside the narrow-area beams can communicate with any other earth station within the principal service area via the broad-area beam system or with an earth station within the narrow-area beam via the broad-area beam or narrow-area beam system. Earth stations within the narrow-area beams can communicate with earth stations outside the narrow-area beams via the broad-area beam system or with earth stations in other narrow-area areas via the narrow-area beam system or the broad-area beam system, or with earth stations within the same narrow-area beam by intra narrow-area beam communications. Accordingly, point-to-point, multipoint-to-multipoint, point-to-multipoint, and multipoint-to-point communications are conveniently available.

The overall effect of the described broad and narrow-area beam topology is that the various frequencies within the allocated up-link and down-link frequency spectrum are used N+1 times, that is, once for the entire broad-beam service area and once for each spatially diverse narrow-area beam to permit a substantial increase in the number of frequency reusages. Since each of the narrow-area beams generally illuminates a high-traffic node, substantial increases in communication efficiency are obtained.

Figure 3:
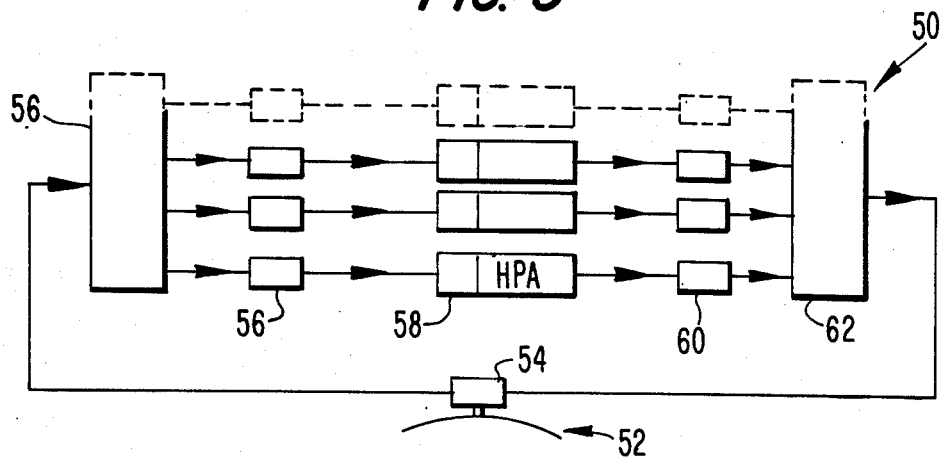
FIG. 3 is an exemplary block diagram of a conventional satellite transponder system.

A generalized satellite transponder architecture of a type currently used in domestic satellite service communications is illustrated in block diagram in FIG. 3 and is designated generally therein by the reference character 50, the various functional blocks being shown in both solid and broken line to illustrate the open-ended nature of the transponder. The transponder 50 includes one or more antennas, indicated generally at 52, that can function for both transmission and reception through an antenna coupler 54. A receiver 56 is adapted to effect amplification and a down-conversion of the received up-link energy from the up-link band (14.0 GHz) to the down-link band (12 GHz). A multiplicity of band-pass filters 56 of different center frequencies in the allocated bandwidth are provided at the receiver output to divide the received frequency spectrum into various sub-bands or channels of selected bandwidth. Each channel, which may contain one or more signal carriers, is subjected to amplification as it is propagated forwardly through the transponder 50, the amplifier function presented generically as high-power amplifiers (HPA) 58. As is known, the high power amplifiers can include traveling wave tube amplifiers (TWTA), solid state, semiconductor, or other types of amplifiers. The amplified output of the various channels is refiltered through respective filters 60, combined in a multiplexer 62, and presented to the antenna 52 for the down-link transmission.

Figure 4:
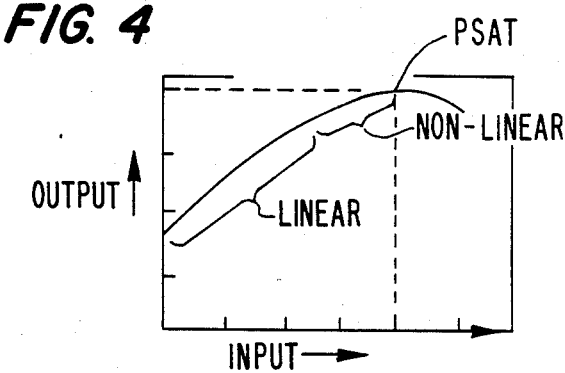
FIG. 4 is a idealized graphical illustration of the power transfer characteristics of a typical high efficiency, high power amplifier.

It has been conventional practice to attempt to operate the HPA's in their non-linear mode, as close to saturation as possible for the purpose of maximizing power output and energy efficiency. As shown by the power transfer characteristic curve for an exemplary HPA in FIG. 4, the saturation point $P_{sat}$ is the maxima where increased input power results in no further increase in output power. It is known that when certain amplifiers are operating at the saturation point, they are most effective for amplifying only a single signal carrier, since multiple-carrier amplification at or near the saturation point causes intermodulation distortion and other signal impairments. When operating an HPA in its linear region, as shown in FIG. 4, many additional signal carriers can be amplified without causing mutual self-degradation.

The radiated power requirements from the satellite to the earth and, conversely, from the earth to the satellite for the individual narrow-area beams are modest compared to the radiated power requirements for the broad-area beam, as the narrow-area beams subtend substantially less surface area than the broad-area beam. It is preferable that the horizontally and vertically polarized emissions have approximately the same power flux density (PFD) at the receiving antenna to permit unimpaired signal discrimination between the two. Thus, for any one narrow-area beam, the power output of the corresponding satellite HPA need not be as high as for the broad-area beam to achieve equal power flux densities at the earth's surface. By way of example, each narrow-area beam can require 1 watt of energy compared to 30 watts for the broad area beam. It is thus possible to usefully operate an HPA well below saturation, in its linear operating region, when generating power for the narrow-area beams and still achieve power flux densities comparable to HPA's operating at saturation in broad-area beams. This then allows the HPA to be used to amplify multiple carriers in a linear manner; accordingly, the multiple narrow-area beam topology presented above does not increase the total number of HPA's required but allows for a reduction in the HPA requirements since a fewer number of HPA's operating in their linear regions are effective to amplify the signal carriers for the entire bandwidth used in the narrow-area beam communication.

Figure 5:
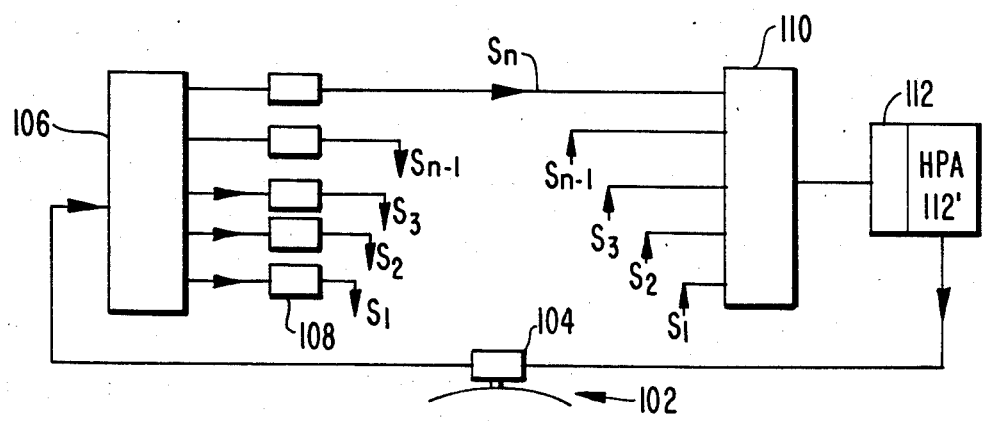
FIG. 5 is a schematic diagram illustrating a representative transponder system as part of a narrow-area beam satellite system in accordance with the present invention.

FIG. 5 represents a narrow-area satellite beam transponder architecture, designated generally by the reference character 100, that illustrates the reduction in total HPA requirements for the satellite. In the satellite, many transponders of the type shown in FIG. 5 are provided depending upon the number of narrow-area beams desired. One or more antennas, represented by the antenna 102, is coupled through an antenna coupler 104 to the receiver 106 which effects amplification and a downconversion of the up-link transmissions from a single narrow-area beam area. Filters 108 are provided at the output of the receiver 106 to divide the downconverted output into channels of selected bandwidth. The output of the various filters 106 is provided to a switching or routing subsystem (not shown) by which the filtered channel output of other the narrow-area and broad-area receivers can be selectively routed to one another in a desired configuration The signal carriers for the same and the other beams are then presented to a channel combiner 110 and a common amplifier 112 and its HPA 112', which operates in its linear region to amplify each of the narrow-area beam carriers in a single HPA, in contrast to the conventional transponder of FIG. 3. Thus it can be seen that one or two HPA's provide sufficient radiated power for the use of the total allocated bandwidth, whereas a multiplicity of HPA's must be used to effectively use the bandwidth for the broad-area beam. The effective isotropic radiated power of each narrow-area beam is commensurate with that for the broad-area beam, so that the power flux density at the earth's surface for both beam types is approximately similar.

As can be appreciated, the described beam topology allows for multiple reuses of the same frequency bands from the same satellite for the principal service area and parts thereof with only incremental increases in radiated power requirements for each additional frequency use, the size of the feed power increments being such that the HPA's that amplify the narrow-area beam carriers can be backed-off from their non-linear operating regions to operate in their linear region to simultaneously amplify multiple broadband narrow-area beam channels without signal degradation. The present invention thus achieves a desirable increase in frequency reusage with only an incremental cumulative increase in feed power and equipment requirements for each additional frequency reuse. As can be appreciated, substantial reductions in information transfer costs, estimated between 50 to 75%, can be obtained with the present invention compared to prior satellite systems. This reduction in cost is obtained, in part, because of lower satellite fabrication and launch costs for each unit of spectrum utilized on the satellite.

Thus it will be appreciated from the above that as a result of the present invention, an improved satellite communications system and methods therefor are provided by which the principal objective, among others, is completely fulfilled. It will be equally apparent and is contemplated that modification and/or changes may be made in the illustrated embodiments without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A satellite communications system comprising:
a communications satellite in a geostationary orbit above the earth's surface, said satellite having transponder means and antenna means, said antenna means for receiving multiple carrier up-link transmissions from the earth and for directing down-link transmissions to the earth, the up-link and down-link transmissions allocated frequency bands of selected bandwidth, the down-link transmissions including transmissions of selected carriers in a broad-area beam polarized in a first alignment for illuminating a selected service area and transmissions of selected carriers in at least N narrow-area beams polarized in a second alignment for illuminating selected sub-areas within the service area, said transponder means including signal processing means for processing received up-link transmissions for down-link transmission to the earth, said signal processing means inlcuding band pass filter means for dividing the received up-link transmissions into frequency-distinct signal carriers, signal carrier combining means for combining selected of the frequency-distinct signal carriers and providing the selected carriers to a signal carrier amplifier means that includes high power amplifier means operable in a linear region and in a non-linear region, at least two signal carriers for transmission in one of said at least N narrow-area beams being amplified by a high power amplifier means operating in its linear regions and a signal carrier for broad-area down-link transmission being amplified by a high power amplifier means operting in its non-linear region.

2. The satellite communications system of claim 1, wherein said polarization alignments are linear.

3. The satellite communications system of claim 2, wherein said polarizations alignments are orthogonal.

4. The satellite communications system of claim 1, wherein said polarization alignments are circular.

5. The satellite communications system of claim 4, wherein said polarization alignments are of opposite hand.

6. The satellite communications system of claim 1, wherein said narrow-area beams include at least one narrow-area beam outside the broad-area beam service area.

7. The satellite communications system of claim 1, wherein said broad-area beam subtends approximately four by six degrees.

8. The satellite communications system of claim 1, wherein at least one of said narrow-area beams subtends between 0.3 and 0.8 degrees.

9. The satellite communications system of claim 1, wherein said down-link transmissions are in the 11.7 to 12.2 GHz band.

10. The satellite communications system of claim 1, wherein said up-link transmissions are in the 14.0 to 14.5 GHz band.

11. The satellite communications system of claim 1, wherein said narrow-area beam illumination patterns are separated sufficiently on the earth's surface to minimize interference.

* * * * *